(12) United States Patent
Tsunoda

(10) Patent No.: US 8,062,807 B2
(45) Date of Patent: Nov. 22, 2011

(54) FUEL CELL

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 875 days.

(21) Appl. No.: 11/990,830

(22) PCT Filed: Aug. 22, 2006

(86) PCT No.: PCT/JP2006/316794
§ 371 (c)(1),
(2), (4) Date: Feb. 21, 2008

(87) PCT Pub. No.: WO2007/023980
PCT Pub. Date: Mar. 1, 2007

(65) Prior Publication Data
US 2009/0123799 A1    May 14, 2009

(30) Foreign Application Priority Data

Aug. 23, 2005    (JP) .................... 2005-241543

(51) Int. Cl.
*H01M 8/04* (2006.01)

(52) U.S. Cl. ........ 429/514; 429/452; 429/454; 429/456; 429/457

(58) Field of Classification Search .................. None
See application file for complete search history.

(56) References Cited

U.S. PATENT DOCUMENTS

| | | |
|---|---|---|
| 5,770,327 A | 6/1998 | Barnett et al. |
| 6,280,869 B1 | 8/2001 | Chen |
| 6,627,342 B1 * | 9/2003 | Nakamura et al. ............ 429/400 |
| 2004/0053108 A1 * | 3/2004 | Tsunoda .................... 429/38 |
| 2004/0197630 A1 | 10/2004 | Wilson et al. |
| 2004/0253502 A1 | 12/2004 | Shibata et al. |
| 2005/0136316 A1 | 6/2005 | Tsunoda et al. |

FOREIGN PATENT DOCUMENTS

| | | |
|---|---|---|
| EP | 1 447 869 A1 | 8/2004 |
| JP | 06-044993 | 2/1994 |
| JP | 08-279364 | 10/1996 |
| JP | 10-294122 | 11/1998 |
| JP | 2002-008681 | 1/2002 |
| JP | 2002-151106 | 5/2002 |
| JP | 2005-5095 | 1/2005 |

OTHER PUBLICATIONS

Japanese Office Action for Application No. 2005-241543, dated May 10, 2011.

* cited by examiner

*Primary Examiner* — Cynthia Lee

(74) *Attorney, Agent, or Firm* — Nelson Mullins Riley & Scarborough LLP; Anthony A. Laurentano

(57) ABSTRACT

A fuel gas channel is divided into first and second fuel gas channel units by a partition. The first fuel gas channel unit has a fuel gas inlet for supplying a fuel gas before consumption from a fuel gas supply passage to a fuel gas flow field, and the second fuel gas channel unit has an exhaust fuel gas diverging holes for diverging at least some of an exhaust fuel gas used at an anode from the fuel gas flow field. The second fuel gas channel unit is connected to the fuel gas supply passage through an exhaust fuel gas diverging passage.

8 Claims, 11 Drawing Sheets

→ OXYGEN-CONTAINING GAS
--→ FUEL GAS

FUEL CELL

RELATED APPLICATIONS

This application is a 35 U.S.C. 371 national stage filing of International Application No. PCT/JP2006/316794, filed 22 Aug. 2006, which claims priority to Japanese Patent Application No. 2005-241543 filed on 23 Aug. 2005 in Japan. The contents of the aforementioned applications are hereby incorporated by reference.

TECHNICAL FIELD

The present invention relates to a fuel cell formed by stacking an electrolyte electrode assembly and a separator alternately. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive oxide such as stabilized zirconia. The electrolyte is interposed between an anode and a cathode to form an electrolyte electrode assembly. The electrolyte electrode assembly is interposed between separators (bipolar plates). In use, predetermined numbers of the electrolyte electrode assemblies and the separators are stacked together to form a fuel cell stack.

In the fuel cell, a gas chiefly containing oxygen or the air (hereinafter also referred to as the "oxygen-containing gas") is supplied to the cathode, and a fuel gas such as a gas chiefly containing hydrogen (hereinafter also referred to as the "hydrogen-containing gas") or CO is supplied to the anode. The oxygen-containing gas and the fuel gas used in the reaction are disposed as an exhaust gas.

Since the exhaust gas contains the unconsumed fuel gas which has not been burned in the reaction, it is not economical to dispose all fuel gas including the unburned fuel gas as an exhaust gas. In this regard, as a technique for reducing the amount of the unburned fuel gas disposed of wastefully, for example, a fuel cell disclosed in Japanese Laid-Open Patent Publication No. 2002-151106 is known.

As shown in FIG. 11, the fuel cell is formed by stacking thin disks 1 and ring plate separators 2 alternately. The disk 1 is made of solid electrolyte material or the like. Ring plate path separators 3, 4 are formed on both surfaces of the disk 1.

A cell reaction passage 5a is formed between one surface of the disk 1 and one separator 2 through the path separator 3, and an air passage 5b is formed between the other surface of the disk 1 and the other separator 2 through the path separator 4.

A through hole 6 forming a fuel gas passage is provided at the center of the disk 1, and a plurality of combustion gas passages 7 are provided around the through hole 6. The through hole 6 is connected to the inlet of the cell reaction passage 5a through distribution inlet holes 8a, and the outlet of the cell reaction passage 5a is connected to the combustion gas passages 7 through discharge holes 8b.

According to the disclosure, fuel gas flows along the through hole 6, and then, the fuel gas is supplied into the cell reaction passage 5a through the respective distribution inlet holes 8a. The fuel gas makes a U-turn in the outer region of the disk 1, and flows into the combustion gas passages 7 from the discharge holes 8b. Then, the unburned fuel gas which is discharged to the combustion gas passages 7 is supplied into the through hole 6 of the fuel cell (not shown) connected to the combustion gas passages 7 on the downstream side, and used again for reaction. Thus, complete combustion of the fuel gas is achieved.

In the conventional technique, the through hole 6 is formed at the center of the disk 1, and combustion gas passages 7 are formed around the through hole 6. Therefore, the process of fabricating the disk 1 is considerably complicated, and special seal structure is required. Further, the shapes of the separator 2 and the path separators 3, 4 are complicated. Thus, the overall structure of the fuel cell is not economical.

Further, the fuel gas before consumption and the fuel gas after consumption are mixed together, and supplied to the cell reaction passage 5a. Therefore, density difference tends to occur in the fuel gas which is supplied to each of the cell reaction passages 5a in the stacking direction. Consequently, the power generation reaction occurs differently depending on the disk 1.

DISCLOSURE OF INVENTION

An object of the present invention is to provide a fuel cell with simple and compact structure which makes it possible to increase utilization ratio of a fuel gas, and achieve suitable power generation reaction.

The present invention relates to a fuel cell formed by stacking an electrolyte electrode assembly and separators alternately. The electrolyte electrode assembly includes an anode, a cathode, and an electrolyte interposed between the anode and the cathode. An oxygen-containing gas flow field for supplying an oxygen-containing gas to the cathode is formed on one surface of each separator, and a fuel gas flow field for supplying a fuel gas to the anode is formed on the other surface of each separator. A fuel gas supply passage for supplying the fuel gas before consumption extends through the fuel cell in the stacking direction.

The separator has a fuel gas channel connected to the fuel gas supply passage, between the fuel gas flow field and the oxygen-containing gas flow field. The fuel gas channel is divided into first and second fuel gas channel units by a partition. The first fuel gas channel unit has a fuel gas inlet for supplying the fuel gas before consumption from the fuel gas supply passage to the fuel gas flow field. The second fuel gas channel unit has an exhaust fuel gas diverging hole for diverging at least some of an exhaust fuel gas which has been used in the reaction at the anode from the fuel gas flow field. The second fuel gas channel unit is connected to the fuel gas supply passage through an exhaust fuel gas diverging passage.

Preferably, the separator includes first and second plates which are stacked together; the first and second plates have first and second protrusions protruding in different directions; the first protrusion comprises a plurality of protrusions which contact an inner region of the anode to form the fuel gas flow field and a substantially ring shaped protrusion provided around the plurality of protrusions to contact an outer region of the anode; the first fuel gas channel unit is formed by the back surface of the plurality of protrusions and the partition; and the second fuel gas channel unit is formed by the back surface of the substantially ring shaped protrusion and the partition.

Further, preferably, the first and second protrusions function as a current collector for collecting electrical energy generated in the electrolyte electrode assembly. Further, preferably, the exhaust fuel gas diverging hole extends through the substantially ring shaped protrusion in the stacking direction.

Further, preferably, the separator has an exhaust gas channel for discharging the fuel gas and the oxygen-containing gas consumed in the reaction in the electrolyte electrode assembly as an exhaust gas in the stacking direction; and the fuel gas supply passage and the exhaust fuel gas diverging passage are provided inside the exhaust gas channel.

Further, preferably, the first fuel gas channel unit forms a first fuel gas pressure chamber over an electrode surface of the anode such that the first plate is interposed between the first fuel gas pressure chamber and the anode, and the first plate contacts the anode under pressure when the fuel gas is supplied into the first fuel gas pressure chamber; and the second fuel gas channel unit forms a second fuel gas pressure chamber over the electrode surface of the anode around the first fuel gas pressure chamber such that the first plate is interposed between the second fuel gas pressure chamber and the anode, and the first plate contacts the anode under pressure when the fuel gas is supplied into the second fuel gas pressure chamber.

Further, preferably, the fuel cell further comprises an oxygen-containing gas channel connected to the oxygen-containing flow field, and a third plate for dividing the fuel gas channel and the oxygen-containing gas channel is provided between the first and second plates.

Further, a fuel gas-distribution channel connecting the fuel gas supply passage and the fuel gas channel is formed between the first and third plates; and an oxygen-containing gas distribution channel connecting an oxygen-containing gas supply channel for supplying the oxygen-containing gas before consumption in the stacking direction and the oxygen-containing gas channel is formed between the second and third plates.

Further, an evaporator for evaporating water and a reformer, which reforms fuel to produce a fuel gas, connected to the fuel gas supply passage are connected to a stack body of the electrolyte electrode assembly and the separators from the upstream side to the downstream side in a direction of supplying the fuel gas; and the exhaust fuel gas diverging passage is connected between the evaporator and the reformer for supplying the exhaust fuel gas to the reformer.

BEST MODE FOR CARRYING OUT THE INVENTION

Figure 1:
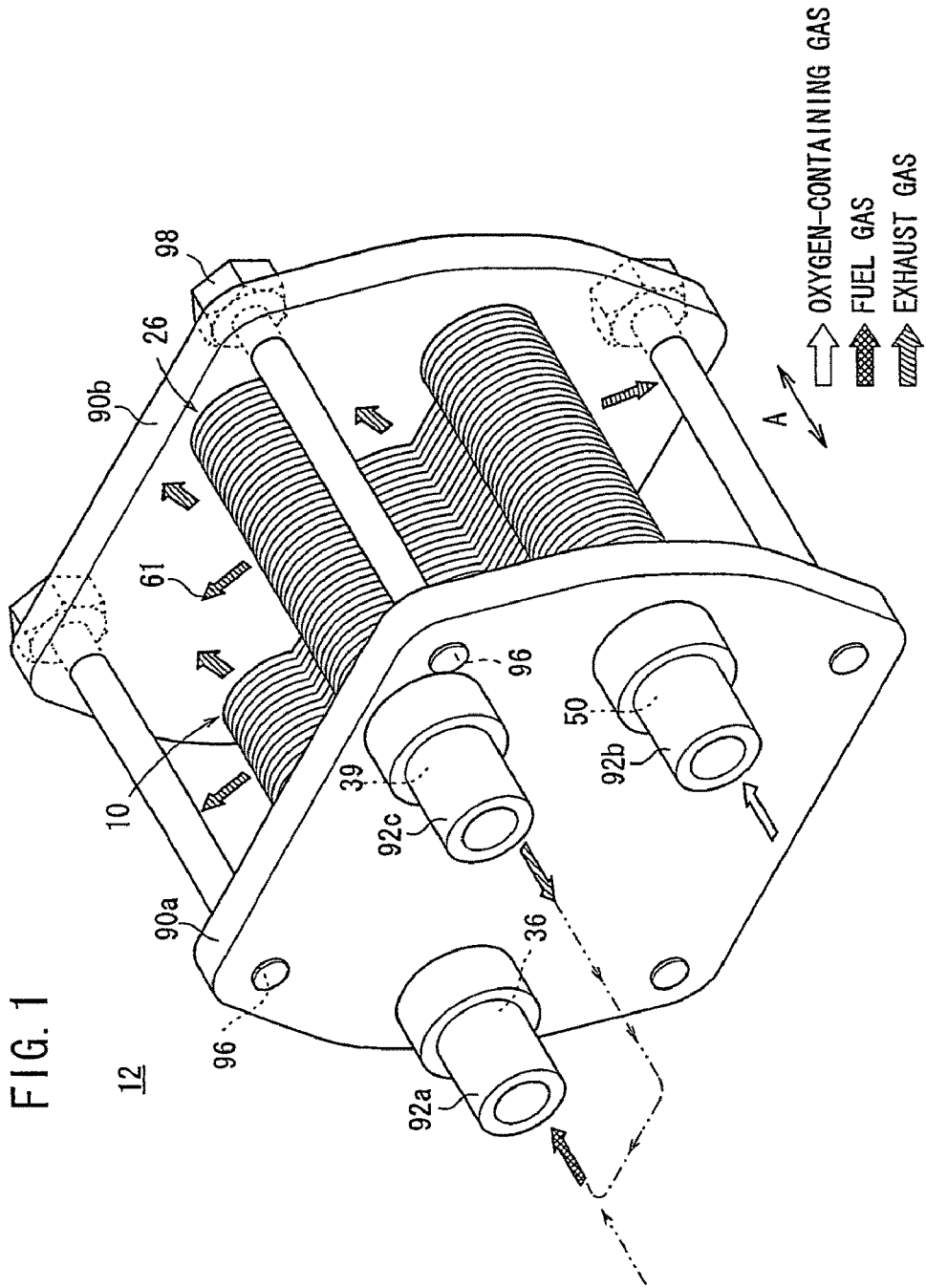
FIG. 1 is a perspective view schematically showing a fuel cell stack formed by stacking a plurality of fuel cells according to a first embodiment of the present invention.

FIG. 1 is a perspective view schematically showing a fuel cell stack 12 formed by stacking a plurality of fuel cells 10 according to a first embodiment of the present invention in a direction indicated by an arrow A.

Figure 2:
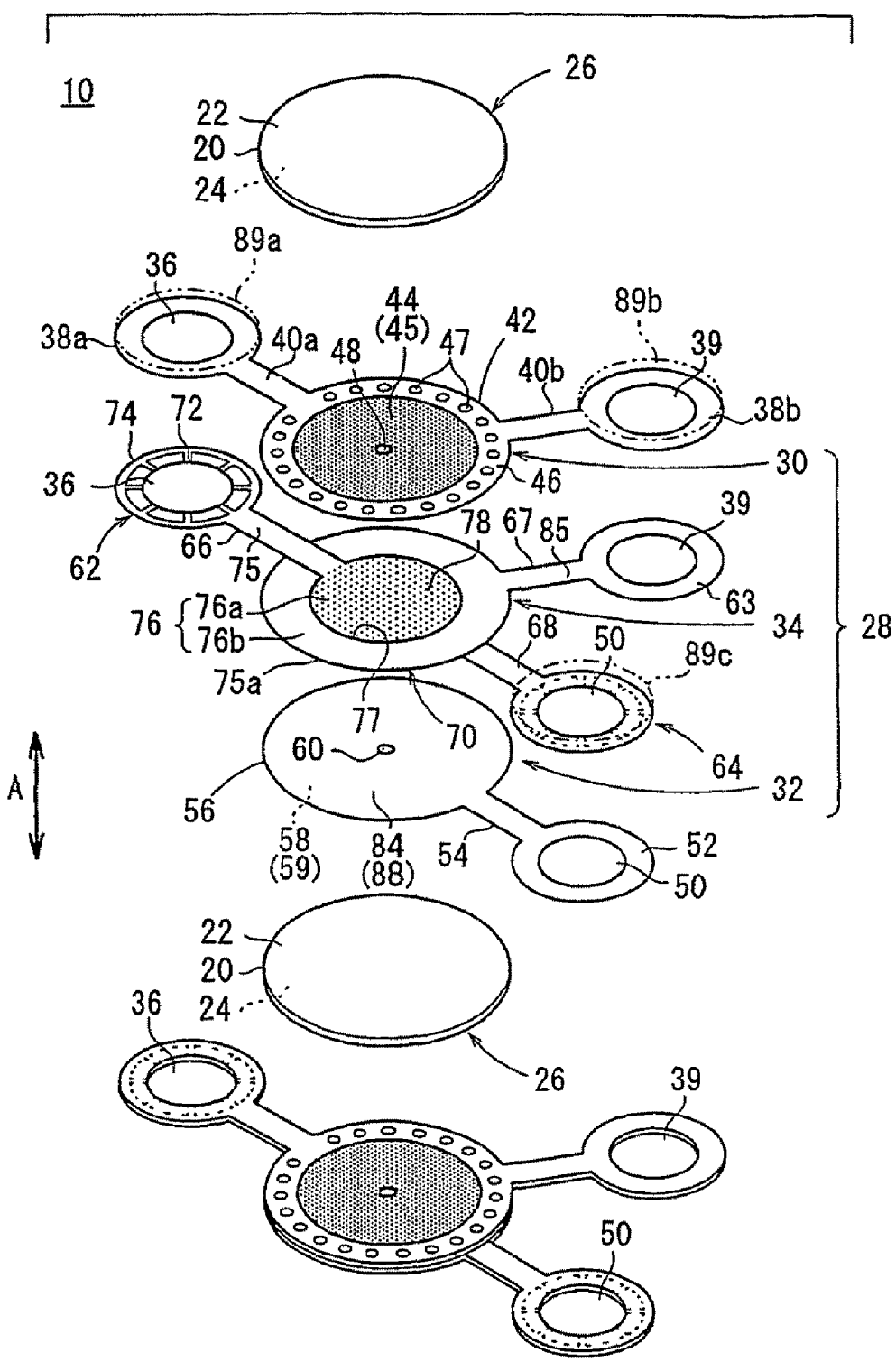
FIG. 2 is an exploded perspective view showing the fuel cell.
Figure 3:
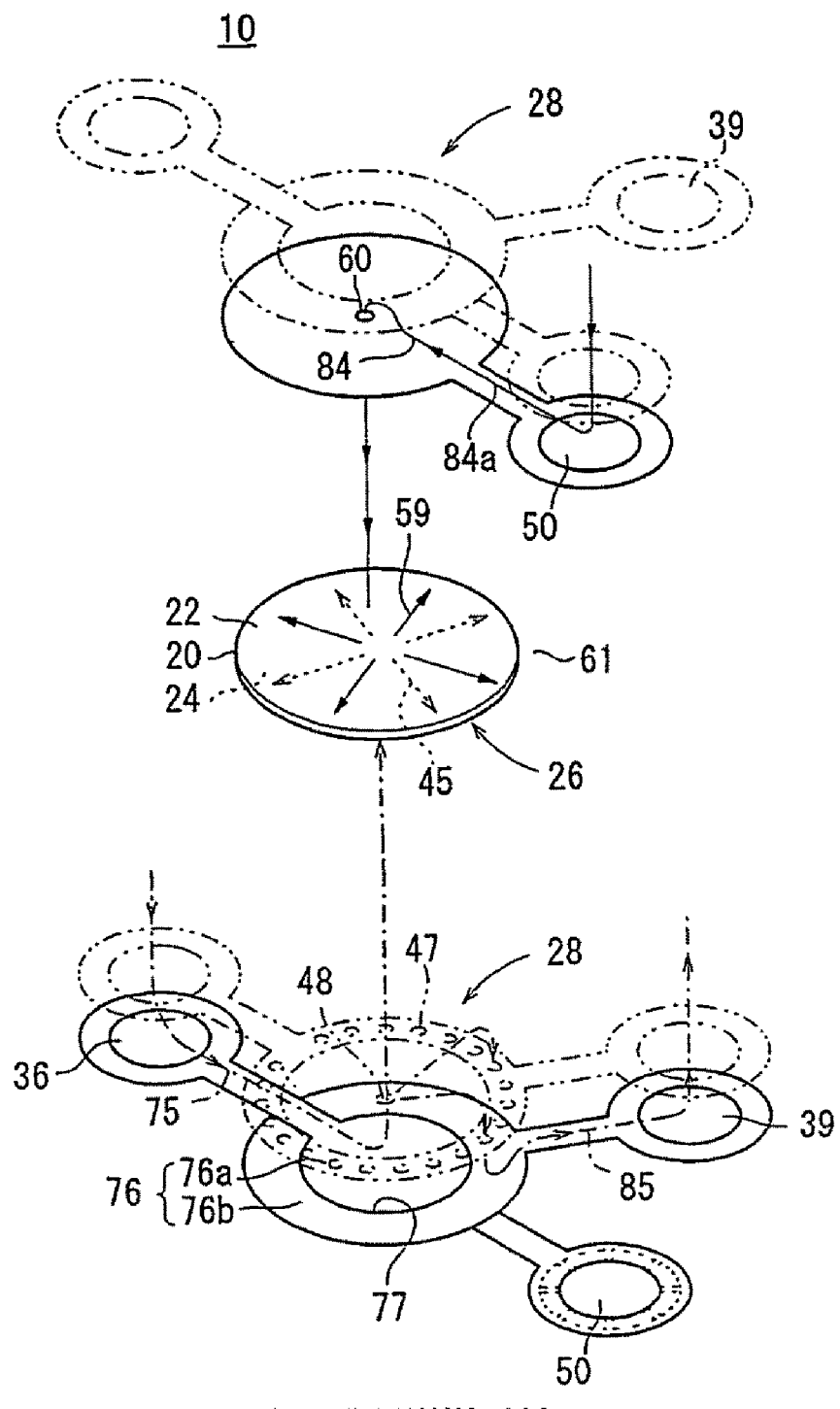
FIG. 3 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 2 and 3, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive oxide such as stabilized zirconia. The electrolyte electrode assembly 26 has a circular disk shape.

The fuel cell 10 is formed by sandwiching the electrolyte electrode assembly 26 between a pair of separators 28. The separator 28 includes first and second plates 30, 32, and a third plate 34 interposed between the first and second plates 30, 32. For example, the first to third plates 30, 32, 34 are metal plates of, e.g., stainless alloy. The first plate 30 and the second plate 32 are joined to both surfaces of the third plate 34 by brazing, for example.

As shown in FIG. 2, the first plate 30 has a first small diameter end portion (fuel gas supply unit) 38a and a second small diameter end portion (exhaust fuel gas supply unit) 38b. A fuel gas supply passage 36 for supplying a fuel gas in the stacking direction indicated by the arrow A extends through the first small diameter end portion 38a. An exhaust fuel gas diverging passage 39 for allowing the exhaust fuel gas to partially flow through the exhaust fuel gas diverging passage 39 extends through the second small diameter end potion 38b. The first small diameter end portion 38a and the second small diameter end portion 38b are integral with a first circular disk 42 having a relatively large diameter through narrow bridges 40a, 40b. The first circular disk 42 and the anode 24 of the electrolyte electrode assembly 26 have substantially the same size.

A large number of first protrusions 44 are formed on a surface of the first circular disk 42 which contacts the anode 24, in a central region inside an outer circumferential region. A substantially ring shaped protrusion 46 is provided in the outer circumferential region of the first circular disk 42. The first protrusions 44 contact the anode 24 of the electrolyte electrode assembly 26 to form a fuel gas flow field 45 for supplying fuel gas to the anode 24 between the anode 24 and the first protrusions 44. The first protrusions 44 and the substantially ring shaped protrusion 46 jointly function as a current collector.

A fuel gas inlet 48 is provided at the center of the first circular disk 42 for supplying the fuel gas toward substantially the central region of the anode 24. A plurality of exhaust fuel gas diverging holes 47 extend through the substantially ring shaped protrusion 46 in the stacking direction in the outer circumferential region of the first circular disk 42. The first protrusions 44 may be formed by making a plurality of recesses in a surface which is in the same plane with the surface of the substantially ring shaped protrusion 46.

The second plate 32 has a third small diameter end portion 52. An oxygen-containing gas supply passage 50 for supplying an oxygen-containing gas in the direction indicated by the arrow A extends through the third small diameter end portion 52. The third small diameter end portion 52 is integral with a second circular disk 56 having a relatively large diameter through a narrow bridge 54.

Figure 4:
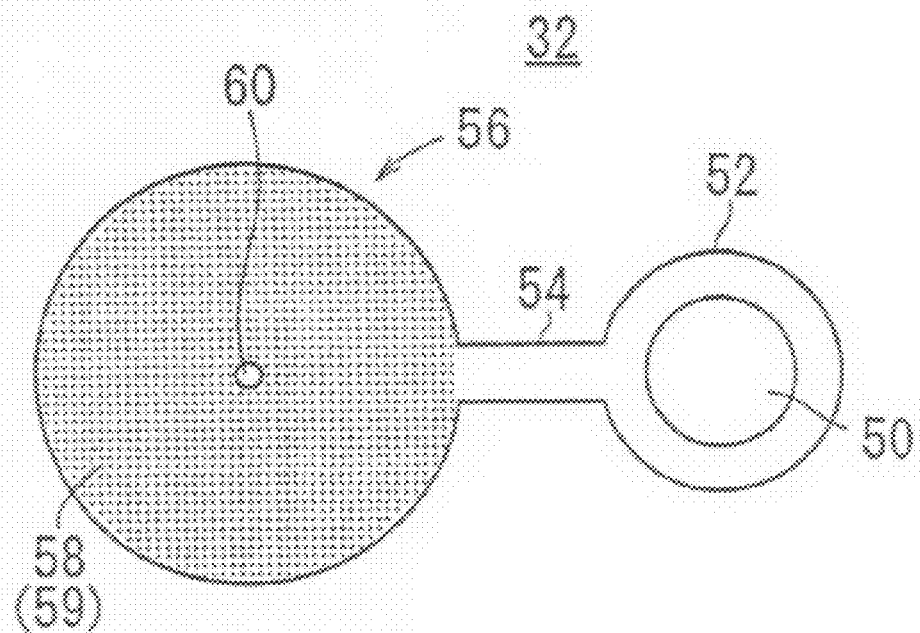
FIG. 4 is a front view showing a second plate of the fuel cell.

As shown in FIG. 4, a plurality of second protrusions 58 are formed on the entire surface of the second circular disk 56 which contacts the cathode 22 of the electrolyte electrode assembly 26. The second protrusions 58 contact the cathode 22 of the electrolyte electrode assembly 26 to form an oxygen-containing gas flow field 59 for supplying the oxygen-containing gas to the cathode 22 between the cathode 22 and the second protrusions 58. The second protrusions 58 function as a current collector. An oxygen-containing gas inlet 60 is provided at the center of the second circular disk 56 for supplying the oxygen-containing gas toward substantially the central region of the cathode 22.

As shown in FIG. 3, in the fuel gas flow field 45, the fuel gas flows from the central region to the outer region of the electrolyte electrode assembly 26, and in the oxygen-containing gas flow field 59, the oxygen-containing gas flows from the central region to the outer region of the electrolyte electrode assembly 26. An exhaust gas channel 61 is formed around the electrolyte electrode assembly 26 for discharging an exhaust gas as the mixture of the exhaust fuel gas and the exhaust oxygen-containing gas to the outside of the fuel cell 10.

As shown in FIG. 2, the third plate 34 has a fourth small diameter end portion 62, a fifth small diameter end portion 63, and a sixth small diameter end portion 64. The fuel gas supply passage 36 extends through the fourth small diameter end portion 62, the exhaust fuel gas diverging passage 39 extends through the fifth small diameter end portion 63, and the oxygen-containing gas supply passage 50 extends through the sixth small diameter end portion 64. The fourth to and sixth small diameter end portions 62, 63, 64 are integral with a third circular disk 70 having a relatively large diameter through narrow bridges 66, 67, 68, respectively. The first to third circular disks 42, 56, 70 have the same diameter.

Figure 5:
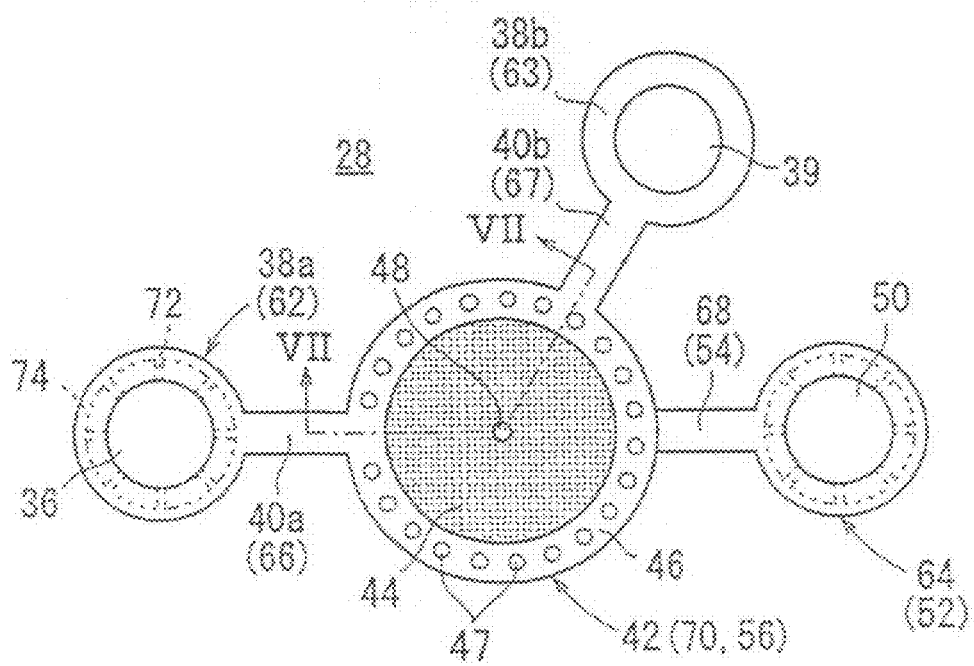
FIG. 5 is a plan view showing the fuel cell.

As shown in FIGS. 2 and 5, the third plate 34 has a plurality of slits 72 radially formed in the fourth small diameter end portion 62, on a surface facing the first plate 30. The slits 72 are connected to the fuel gas supply passage 36. Further, the slits 72 are connected to a recess 74 formed in an outer circumferential region of the fourth small diameter end portion 62.

Ridges 75a are provided along the outer edges of the fourth small diameter end portion 62, the bridge 66, and the third circular disk 70 such that a fuel gas distribution channel (fuel gas supply channel) 75 and a fuel gas channel 76 are formed in the surfaces of the fourth small diameter end portion 62, the bridge 66, and the third circular disk 70. The fuel gas distribution channel 75 and the fuel gas channel 76 are connected to the fuel gas supply passage 36 through the slits 72 (see FIG. 2).

In the surface of the third circular disk 70 facing the first plate 30, a partition 77 is provided along a circle concentric with the center of the third circular disk 70. The partition 77 comprises a substantially ring shaped wall. The fuel gas channel 76 is divided into first and second fuel gas channel units 76a, 76b by the partition 77. A plurality of third protrusions 78 are provided in the surface of the third circular disk 70 inside the partition 77.

Figure 6:
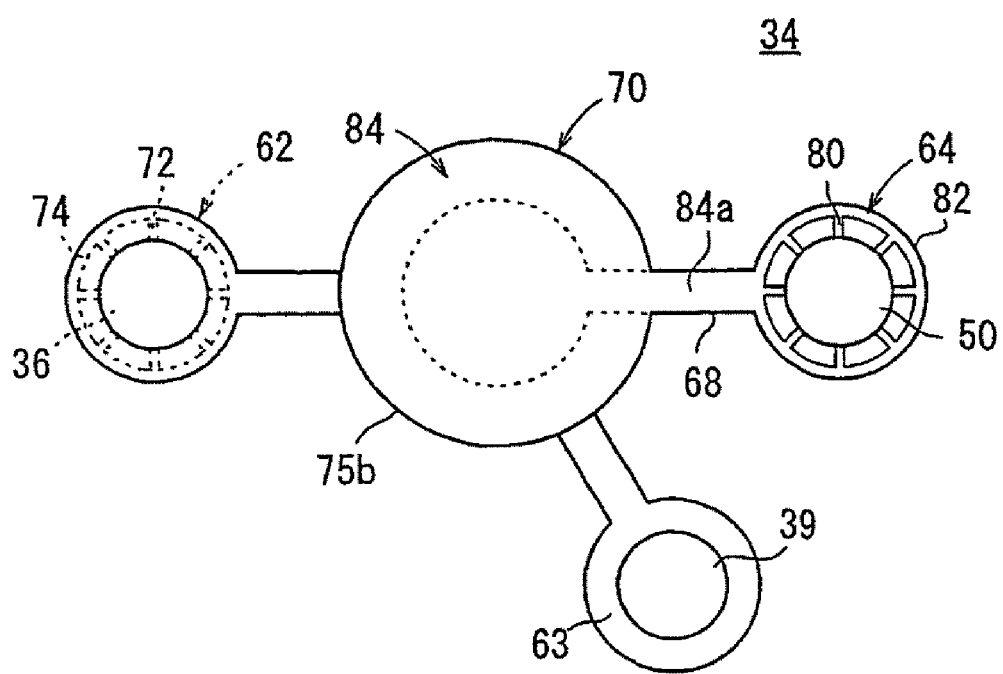
FIG. 6 is a view, with partial omission, showing a third plate of the fuel cell.

As shown in FIG. 6, the third plate 34 has a plurality of slits 80 radially formed in the sixth small diameter end portion 64, on a surface facing the second plate 32. The slits 80 are connected to the oxygen-containing gas supply passage 50. Further, the slits 80 are connected to a recess 82. The recess 82 prevents the entry of brazing material into slits 80, and into an area inside the recess 82.

Ridges 75b are provided along the outer edges of the sixth small diameter end portion 64, the bridge 68, and the third circular disk 70 such that an oxygen-containing gas distribution channel 84a and an oxygen-containing gas channel 84 are formed in the surfaces of the sixth small diameter end portion 64, the bridge 68, and the third circular disk 70. The oxygen-containing gas distribution channel 84a and the oxygen-containing gas channel 84 are connected to the oxygen-containing gas supply passage 50 through the slits 80.

The first plate 30 is joined to one surface of the third plate 34 by brazing to form the fuel gas channel 76 connected to the fuel gas supply passage 36 between the first and third plates 30, 34. An exhaust fuel gas diverging channel 85 connected to the second fuel gas channel unit 76b and the exhaust fuel gas diverging passage 39 is formed between the bridge 40b of the first plate 30 and the bridge 67 of the third plate 34 (see FIGS. 3 and 7).

The first fuel gas channel unit 76a is provided between the first and third circular disks 42, 70 over the electrode surface of the anode 24. The first circular disk 42 is provided between the first fuel gas channel unit 76a and the anode 24 to form a first fuel gas pressure chamber 86a. When the fuel gas is supplied to the first fuel gas pressure chamber 86a, the first circular disk 42 tightly contacts the anode 24 under pressure. The second fuel gas channel unit 76b is provided around the first fuel gas pressure chamber 86a between the first and third circular disks 42, 70 over the electrode surface of the anode 24, and the first circular disk 42 is provided between the second fuel gas channel unit 76b and the anode 24 to form a second fuel gas pressure chamber 86b. When the fuel gas is supplied to the second fuel gas pressure chamber 86b, the first circular disk 42 tightly contacts the anode 24 under pressure.

Figure 7:
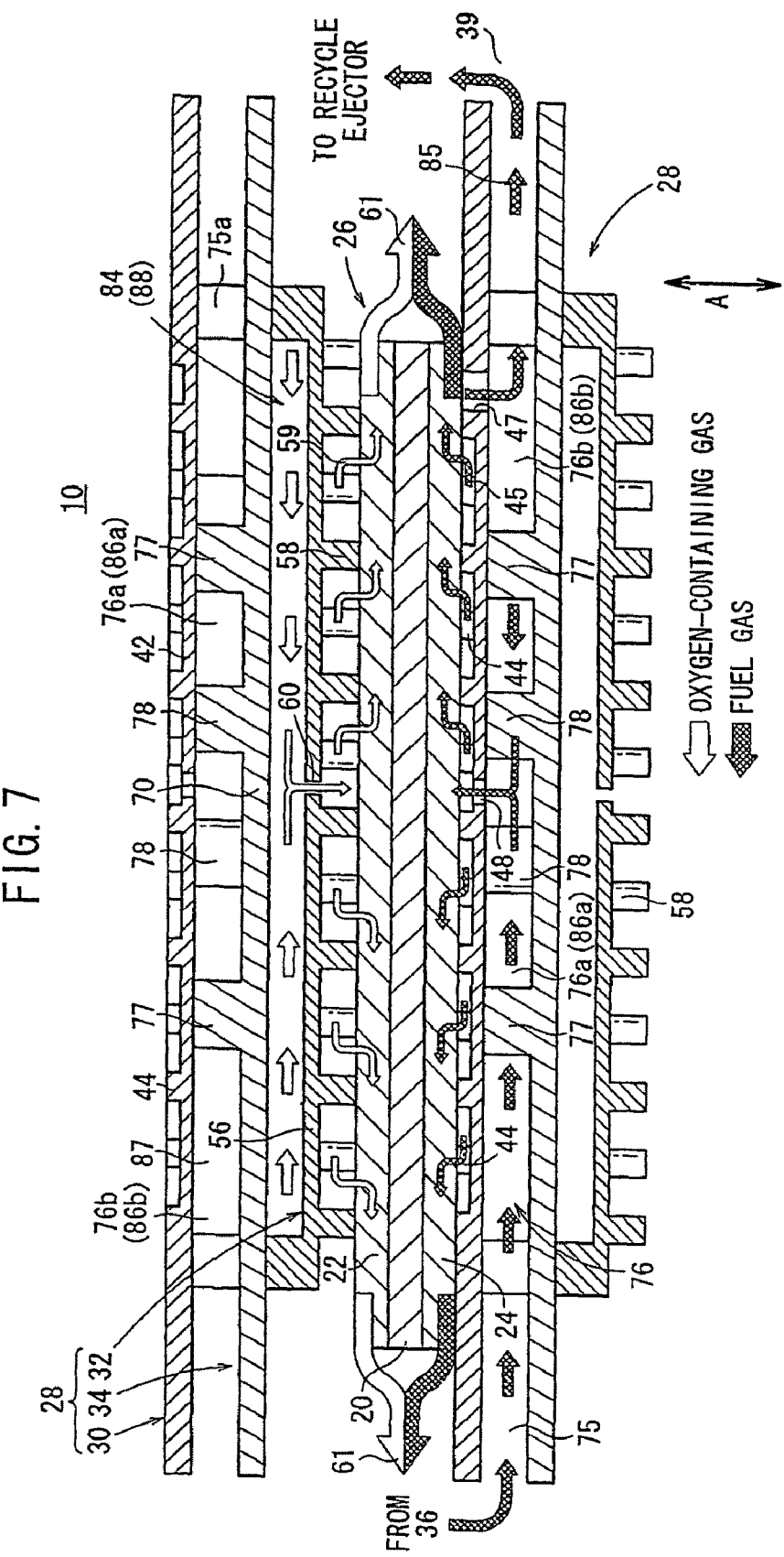
FIG. 7 is a cross sectional view of the fuel cell taken along a line VII-VII in FIG. 5.

The second plate 32 is joined to the third plate 34 by brazing to form the oxygen-containing gas channel 84 connected to the oxygen-containing gas supply passage 50 between the second and third plates 32, 34 (see FIG. 7). The oxygen-containing gas distribution channel 84a is formed between the bridge 54 of the second plate 32 and the bridge 68 of the third plate 34.

The oxygen-containing gas channel 84 is provided between the second and third circular disks 56, 70, over the electrode surface of the cathode 22, and the second circular disk 56 is provided between the oxygen-containing gas channel 84 and the cathode 22 to form an oxygen-containing gas pressure chamber 88. When the oxygen-containing gas is supplied to the oxygen-containing gas pressure chamber 88, the second circular disk 56 tightly contacts the cathode 22 under pressure.

As shown in FIG. 2, an insulating seal 89a for sealing the fuel gas supply passage 36, an insulating seal 89b for sealing the exhaust fuel gas diverging passage 39, and an insulating seal 89c for sealing the oxygen-containing gas supply passage 50 are provided between the separators 28. For example, the insulating seals 89a, 89b, 89c are made of mica material, or ceramic material.

As shown in FIG. 1, the fuel cell stack 12 includes end plates 90a, 90b provided at opposite ends of the fuel cells 10 in the stacking direction. The end plate 90a or the end plate 90b are electrically insulated from tightening bolts 98. A first pipe 92a, a second pipe 92b, and a third pipe 92c extend through the end plate 90a. The first pipe 92a is connected to the fuel gas supply passage 36, the second pipe 92b is connected to the oxygen-containing gas supply passage 50, and the third pipe 92c is connected to the exhaust fuel gas diverging passage 39. The third pipe 92c is connected to a merge section on the upstream of the first pipe 92a. The second fuel gas channel unit 76b is connected to the fuel gas supply passage 36 through the exhaust fuel gas diverging passage 39.

The end plate 90a has screw holes 96 at positions above and under the fuel gas supply passage 36, and at positions above and under the oxygen-containing gas supply passage 50. Tightening bolts 98 are inserted into the respective screw holes 96 for tightening components of the fuel cell stack 12.

Next, operation of the fuel cell stack 12 will be described below.

As shown in FIG. 2, in assembling the fuel cell 10, firstly, the first plate 30 of the separator 28 is joined to one surface of the third plate 34, and the second plate 32 is joined to the other surface of the third plate 34. Thus, the third plate 34 divides a space in the separator 28 to form the fuel gas channel 76 connected to the fuel gas supply passage 36 and the oxygen-containing gas channel 84 connected to the oxygen-containing gas supply passage 50 separately (see FIG. 7). The fuel gas channel 76 is divided by the partition 77 into the first fuel gas channel unit 76a and the second fuel gas channel unit 76b (FIGS. 2 and 3).

Further, the first and second fuel gas pressure chamber 86a, 86b are formed between the first and third circular disks 42, 70, and the oxygen-containing gas pressure chamber 88 is formed between the second and third-circular disks 56, 70 (see FIG. 7).

Then, the separators 28 and the electrolyte electrode assemblies 26 are stacked alternately, and the end plates 90a, 90b are provided at the opposite ends in the stacking direction. The end plate 90a or the end plate 90b is electrically insulated from the tightening bolts 98. The tightening bolts 98 are inserted into the respective screw holes 96 of the end plate 90a to form the fuel cell stack 12 (see FIG. 1).

A fuel gas is supplied to the first pipe 92a connected to the end plate 90a, and flows from the first pipe 92a to the fuel gas supply passage 36. The oxygen-containing gas such as the air is supplied to the second pipe 92b connected to the end plate 90a, and the oxygen-containing gas flows from the second pipe 92b to the oxygen-containing gas supply passage 50.

As shown in FIGS. 3 and 7, after the fuel gas flows into the fuel gas supply passage 36, the fuel gas flows in the stacking direction indicated by the arrow A, and then, the fuel gas is supplied to the fuel gas distribution channel 75 in the separator 28 in each of the fuel cells 10. The fuel gas flows along the fuel gas distribution channel 75, and flows into the first fuel gas channel unit 76a formed between the first and third circular disks 42, 70. The fuel gas inlet 48 is formed at the center of the first fuel gas channel unit 76a. The fuel gas flows from the fuel gas inlet 48 to the fuel gas flow field 45.

The fuel gas inlet 48 is provided at the central position of the anode 24 of each of the electrolyte electrode assemblies 26. Therefore, as shown in FIG. 7, the fuel gas is supplied from the fuel gas inlet 48 to the anode 24, and flows outwardly from the central region of the anode 24 in the fuel gas flow field 45.

As shown in FIG. 3, the air supplied to the oxygen-containing gas supply passage 50 flows through the oxygen-containing gas distribution channel 84a in the separator 28, and then, the air is supplied to the oxygen-containing gas pressure chamber 88 (oxygen-containing gas channel 84) between the second and third circular disks 56, 70. The air flows into the oxygen-containing gas inlet 60 provided at the central position of the second circular disk 56.

The oxygen-containing gas inlet 60 is provided at the central position of the cathode 22 of each of the electrolyte electrode assemblies 26. Therefore, as shown in FIG. 7, the air is supplied from the oxygen-containing gas inlet 60 to the cathode 22, and the oxygen-containing gas flows outwardly from the central region of the cathode 22.

Therefore, in each of the electrolyte electrode assemblies 26, the fuel gas is supplied to the central region of the anode 24, and flows outwardly from the central region of the anode 24. Similarly, the oxygen-containing gas is supplied to the central region of the cathode 22, and flows outwardly from the central region of the cathode 22. Thus, by electrochemical reactions at the anode 24 and the cathode 22, power generation is performed. The fuel gas and the air used in the power generation is discharged as to the first to third circular disks, 42, 56, 70 as an exhaust gas, and the exhaust gas flows into the exhaust gas channel 61.

In the first embodiment, the fuel gas moving outwardly from the central region of the anode 24 is consumed in the reaction at the anode 24, and discharged to the exhaust gas channel 61 as the exhaust fuel gas containing unburned hydrogen. The exhaust fuel gas partially flows into the second fuel gas channel unit 76b through the exhaust fuel gas diverging holes 47 formed in the substantially ring shaped protrusion 46 of the first circular disk 42 (see FIG. 7). The exhaust fuel gas flows through the exhaust fuel gas diverging channel 85 connected to the second fuel gas channel unit 76b, and flows into the exhaust fuel gas diverging passage 39. The exhaust fuel gas flows along the exhaust fuel gas diverging passage 39 in the stacking direction indicated by the arrow A.

As shown in FIG. 1, the exhaust fuel gas flows along the third pipe 92c connected to the exhaust fuel gas diverging passage 39. The third pipe 92c is connected to a merge section on the upstream of the first pipe 92a. Thus, the exhaust fuel gas is supplied from the first pipe 92a to the fuel gas supply passage 36 together with the fresh fuel gas before consumption. After the fuel gas flows through the fuel gas flow field 45 along the anode 24, the unburned fuel gas in the exhaust fuel gas flows from the second fuel gas channel unit 76b back to the exhaust fuel gas diverging passage 39, and is mixed into the fresh fuel gas, and supplied to the fuel gas supply passage 36 for reuse.

With the simple and compact structure of the fuel cell stack 12, improvement in the fuel gas utilization ratio is achieved effectively, while suitable electrochemical reaction is performed.

In the first embodiment, the exhaust fuel gas contains water produced in the electrochemical reaction. Therefore, when the exhaust fuel gas is mixed into the fresh fuel gas for reuse, the water in the exhaust fuel gas can be utilized in the reforming reaction. In the structure, the amount of water supplied from the outside of the fuel cell stack 12 is reduced sufficiently, and improvement in the power generation efficiency in the system is achieved while reducing the load of a water supply pump or the like.

Figure 8:
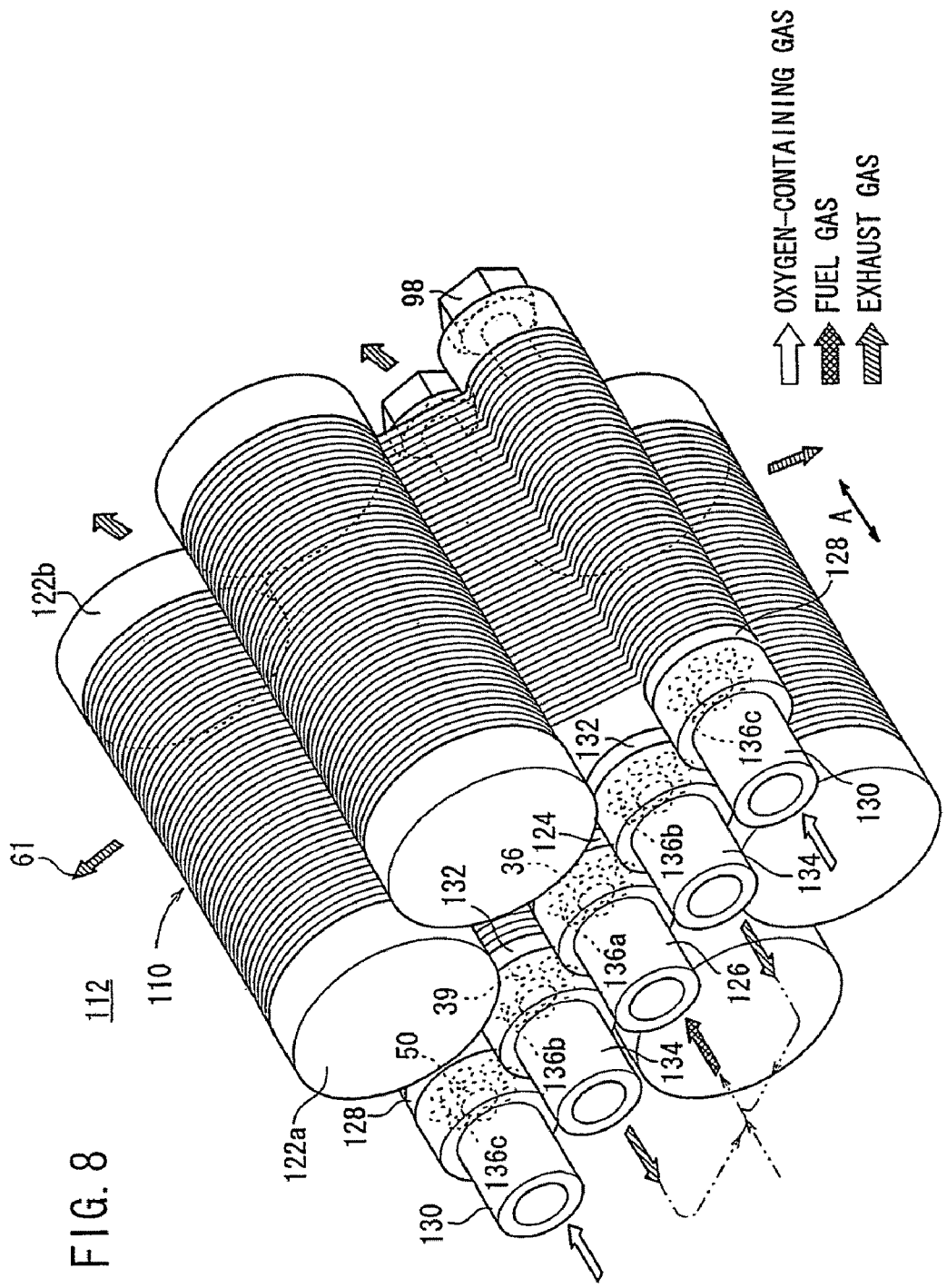
FIG. 8 is a perspective view schematically showing a fuel cell stack formed by stacking a plurality of fuel cells according to a second embodiment of the present invention.
Figure 9:
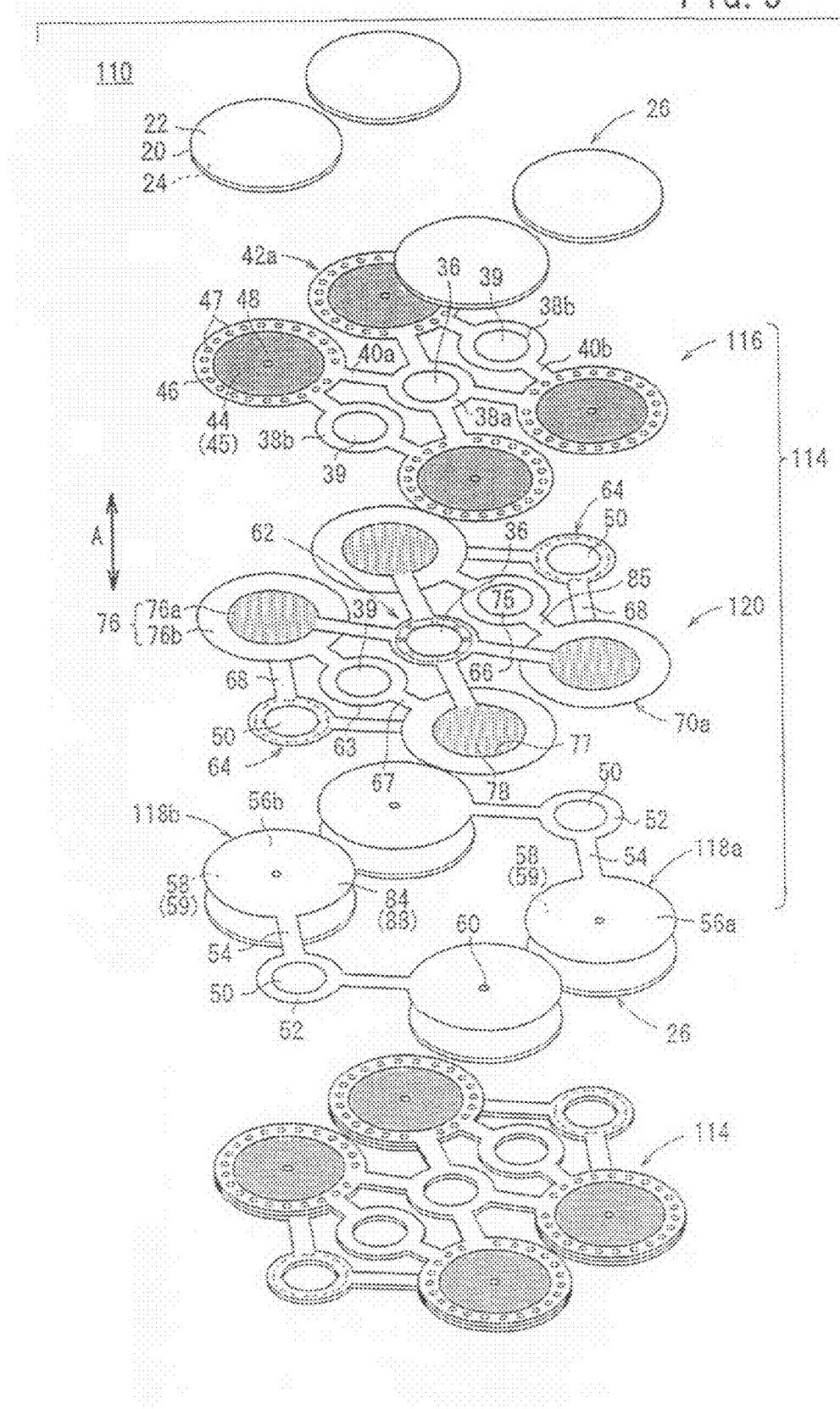
FIG. 9 is an exploded perspective view showing the fuel cell.

FIG. 8 is a perspective view schematically showing a fuel cell stack 112 formed by stacking a plurality of fuel cells 110 according to the second embodiment of the present invention in a direction indicated by an arrow A, and FIG. 9 is an exploded perspective view showing the fuel cell 110. The constituent elements that are identical to those of the fuel cell 100 and the fuel cell-stack 102 according to the first embodiment are labeled with the same reference numeral, and description thereof will be omitted.

As shown in FIG. 9, the fuel cell 110 includes four electrolyte electrode assemblies 26 and a pair of separators 114 sandwiching the electrolyte electrode assemblies 26. Each of the separators 114 includes a first plate 116, a pair of second plates 118a, 118b, and a third plate 120. For example, the first to third plates 116, 118a, 118b, 120 are metal plates of, e.g., stainless alloy. The first plate 116 and the second plates 118a, 118b are joined to both surfaces of the third plate 120 by brazing, for example.

The first plate 116 has a first small diameter end portion 38a and two second small diameter end portions 38b. The fuel gas supply passage 36 extends through the first small diameter end portion 38*a*, and the exhaust fuel gas diverging passages 39 extend through the second small diameter end portions 38*b*. The first small diameter end portion 38*a* and the second small diameter end portions 38*b* are integral with four first circular disks 42*a* each having a relatively large diameter through narrow bridges 40*a*, 40*b*.

Each of the second plates 118*a*, 118*b* has a third small diameter end portion 52. The oxygen-containing gas passage 50 extends though the third small diameter end portion 52. Each of the third small diameter end portions 52 is integral with two second circular disks 56*a*, 56*b* each having a relatively large diameter through narrow bridges 54.

The third plate 120 has a fourth small diameter end portion 62, two fifth small diameter end portions 63, and two sixth small diameter end portions 64. The fuel gas supply passage 36 extends through the fourth small diameter end portion 62, the exhaust fuel gas diverging passages 39 extend through the fifth small diameter end portions 63, and the oxygen-containing gas supply passages 50 extend through the sixth small diameter end portions 64. The fourth small diameter end portion 62 is integral with four third circular disks 70*a* each having a relatively large diameter through four narrow bridges 66. Each of the two fifth small diameter end portions 63 is integral with two third circular disks 70*a* through two narrow bridges 67. Each of the two sixth small diameter end portions 64 is integral with the two third circular disks 70*a* through two narrow bridges 68.

The fuel gas channels 76 are formed in the third circular disks 70*a*. Each of the fuel gas channels 76 is divided into the first and second fuel gas channel units 76*a*, 76*b* by the partition 77.

As shown in FIG. 8, the fuel cell stack 112 includes four end plates 122*a*, 122*b* at opposite ends of the respective fuel cells 110 in the stacking direction. Plates 124 are provided at opposite ends of the fuel gas supply passage 36 in the direction indicated by the arrow A. The first pipe 126 for supplying the fuel gas to the fuel gas supply passage 36 is connected to the plates 124. Further, two plates 128 are provided at each of opposite ends of the oxygen-containing gas supply passages 50. The second pipe 130 for supplying the air to the oxygen-containing gas supply passage 50 is connected to each of the plates 128.

Two plates 132 are provided at each of opposite ends of the exhaust fuel gas diverging passages 39 in the direction indicated by the arrow A. The third pipe 134 for discharging the exhaust fuel gas from the exhaust fuel gas diverging passage 39 is connected to each of the plates 132. The third pipes 134 are connected to a merge section on the upstream of the first pipe 126. The second fuel gas channel unit 76*b* and the fuel gas supply passage 36 are connected through the exhaust fuel gas diverging passage 39.

The plates 124, the plates 128, and the plates 132 at opposite ends in the direction indicated by the arrow A are fixed together by the tightening bolts 98. A plurality of holes 136*a* are formed in the plate 124 at one end. The holes 136*c* connect the oxygen-containing gas supply passages 50 to the second pipes 130. Further, a plurality of holes 136*b* are formed in the plates 132 at one end. The holes 136*b* connect the exhaust fuel gas diverging passages 39 to the third pipes 134.

In the second embodiment, the fuel gas is supplied to the fuel gas supply passage 36 in the fuel cell stack 112 from the first pipe 126, and the air is supplied to the oxygen-containing gas supply passages 50 in the fuel cell stack 112 from the second pipes 130.

The fuel gas supplied to the fuel gas supply passage 36 flows in the stacking direction, and then, the fuel gas is supplied to the four fuel gas channels 76 in the separators 114 of the fuel cells 110. The fuel gas flows along the respective fuel gas channels 76, into the respective first fuel gas channel units 76*a* formed between the first circular disks 42*a* and the third circular disks 70*a*.

Thus, the fuel gas supplied to the first fuel gas channel unit 76*a* flows into the fuel gas inlets 48 toward the central positions of the anodes 24 of the electrolyte electrode assemblies 26.

The air supplied to the two oxygen-containing gas supply passages 50 flows through the oxygen-containing gas channels 84 in the separator 114, and is supplied to the oxygen-containing gas pressure chambers 88 formed between the second circular disks 56*a*, 56*b* and the third circular disks 70*a*, 70*b*. Further, the air is supplied from the oxygen-containing gas inlets 60 at the central positions of the second circular disks 56*a*, 56*b* to the central positions of the cathodes 22 of the electrolyte electrode assemblies 26.

The fuel gas moving in the fuel gas flow field 45 along the anode 24 is consumed in the reaction, and discharged as the exhaust fuel gas into the exhaust gas channel. At least some of the exhaust fuel gas flows from the exhaust fuel gas diverging holes 47 into the second fuel gas channel units 76*b*. The second fuel gas channel units 76*b* are connected to the two exhaust fuel gas diverging passages 39 through the exhaust fuel gas diverging channels 85.

In the structure, the exhaust fuel gas flows along the respective exhaust fuel gas diverging passages 39 in the stacking direction. The third pipes 134 are connected to a merge section on the upstream side of the first pipe 126. Therefore, the exhaust fuel gas is supplied to the fuel gas supply passage 36 together with the fresh fuel gas. Thus, the same advantages as in the case of the first embodiment can be obtained. For example, the unburned gas in the exhaust fuel gas can be used again, and the water in the exhaust fuel gas is used effectively.

Figure 10:
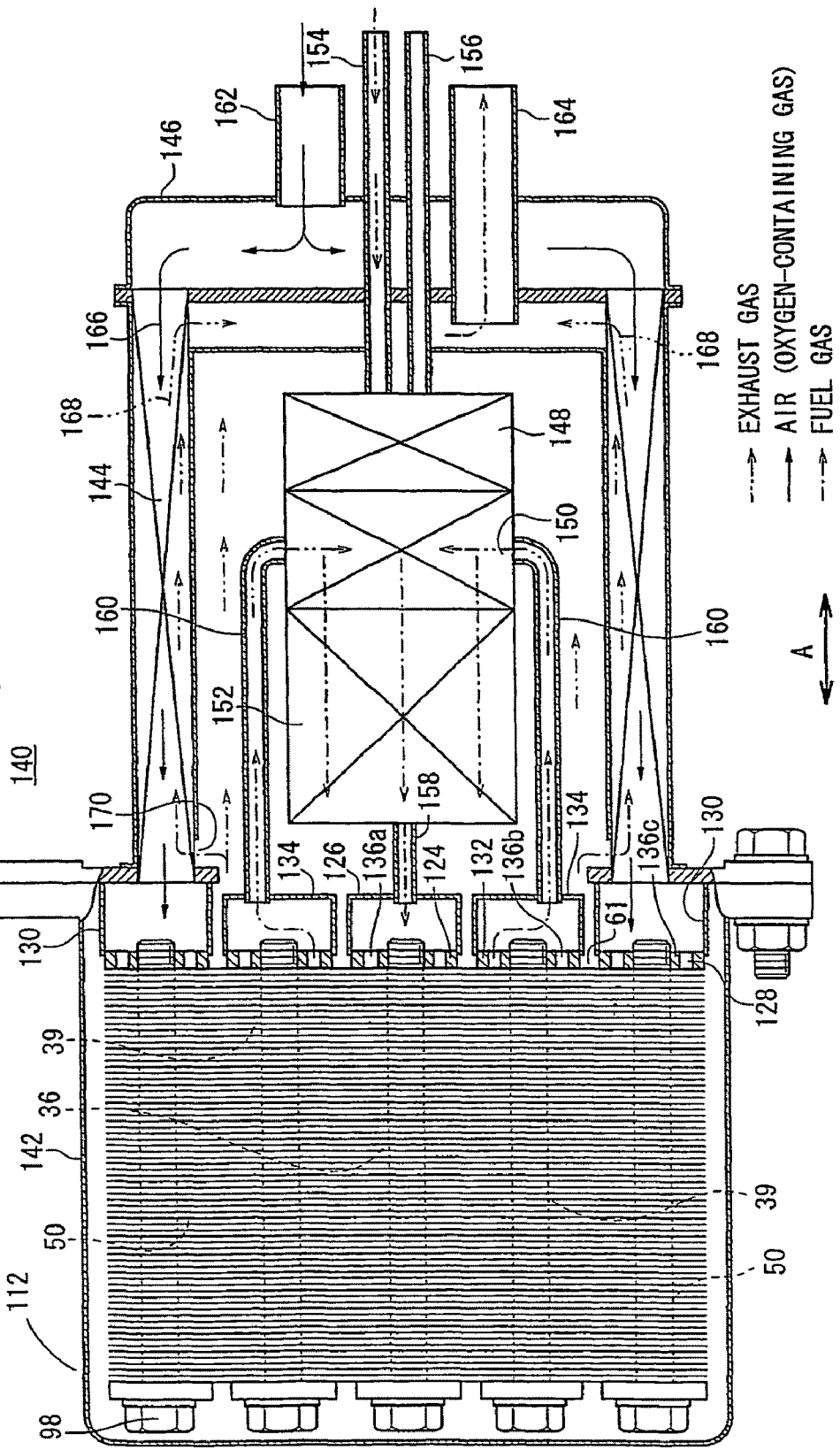
FIG. 10 is a cross sectional view schematically showing a fuel cell system including the fuel cell stack.
Figure 11:
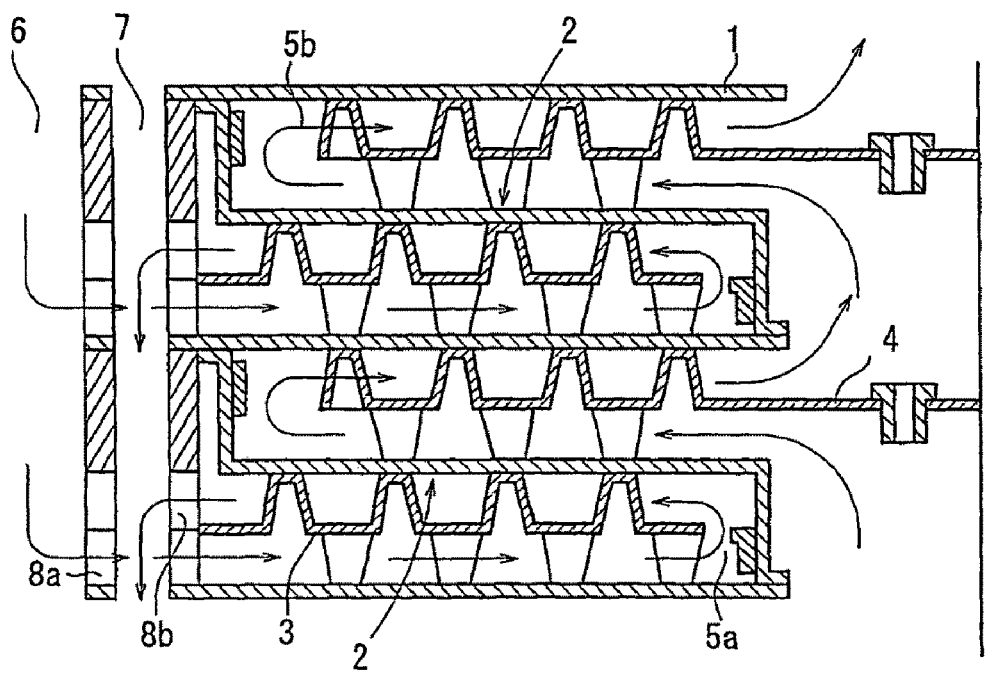
FIG. 11 is a cross sectional view schematically showing a fuel cell disclosed in Japanese Laid-Open Patent Publication No. 2002-151106.

FIG. 10 is a cross sectional view schematically showing a fuel cell system 140 including the fuel cell stack 112 formed by stacking the fuel cells 110 according to the second embodiment.

The fuel cell system 140 is used in various applications, including stationary and mobile applications. For example, the fuel cell system 140 is mounted on a vehicle. The fuel cell system 140 includes a casing 142 containing the fuel cell stack 112. A substantially ring shaped heat exchanger 144 is fixed by screws to an open end of the casing 142, and a head plate 146 is fixed to an end of the heat exchanger 144.

An evaporator 148, an ejector 150, and a reformer 152 are provided coaxially inside the heat exchanger 144 along the flow direction of the fuel gas (stacking direction of the fuel cell stack 112). A reforming fuel supply pipe 154 and a water supply pipe 156 are connected to the evaporator 148, and a reformed gas supply pipe 158 is connected to the reformer 152. The reformed gas supply pipe 158 is connected to the first pipe 126 of the fuel cell stack 112.

Exhaust fuel gas return pipes 160 are connected to the ejector 150. The exhaust fuel gas return pipes 160 are connected to the third pipes 134 of the fuel cell stack 112. By the sucking action under the negative pressure, the ejector 150 is operated to mix the exhaust fuel gas into the reforming fuel supplied from the evaporator 148.

An air supply pipe 162 and an exhaust gas pipe 164 are connected to the head plate 146. A channel 166 and a channel 168 are formed in the heat exchanger 144. The air flows from the air supply pipe 162 into the heat exchanger 144, and flows through the channel 166. The exhaust gas from the exhaust gas channel 61 of the fuel cell stack 112 flows into the heat exchanger 144, and flows through the channel 168 to the exhaust gas pipe 164. The channel 168 is connected to the exhaust gas channel 61 through an opening 170 formed in an inner wall at an end of the heat exchanger 144.

The fuel cell stack 112 is provided in the casing 142 at one end of the fuel cell system 140 in the direction indicated by the arrow A. Further, a fluid unit including the heat exchanger 144, the evaporator 148, the ejector 150, and the reformer 152 is provided locally at the other end of the fuel cell system 140. In the structure, heat is utilized efficiently.

In the fuel cell system 140, raw fuel such as the city gas (including $CH_4$, $C_2H_6$, $C_3H_8$, $C_4H_{10}$) is supplied to the reforming fuel supply pipe 154, water is supplied to the water supply pipe 156, and the oxygen-containing gas such as the air is supplied to the air supply pipe 162.

In the evaporator 148, the water is evaporated, and mixed into the raw fuel to produce a mixture fuel. The mixture fuel is supplied to the reformer 152 through the ejector 150. The mixture fuel flows through the ejector 150 to generate the negative pressure internally. By the negative pressure, the exhaust fuel gas in the exhaust fuel gas return pipe 160 is sucked. Thus, the exhaust fuel gas and the mixture fuel gas are supplied to the reformer 152, and steam reforming is performed in the reformer 152 to produce a reformed gas (fuel gas).

The reformed gas is supplied from the reformed gas supply pipe 158 connected to the outlet of the reformer 152 into the first pipe 126 of the fuel cell stack 112. Then, the reformed gas is supplied from the first pipe 126 to the fuel gas supply passage 36.

The air is supplied from the air supply pipe 162 to the heat exchanger 144. When the air flows along the channel 166 of the heat exchanger 144, heat exchange between the air and the hot exhaust gas flowing along the channel 168 is carried out. Thus, after the air is heated to the desired temperature in advance, the air is supplied from the second pipes 130 to the respective oxygen-containing gas supply passages 50.

In the fuel cell stack 112, the power generation reaction occurs as described above, and the exhaust gas is partially sucked back to the ejector 150 through the exhaust fuel gas return pipes 160, and the exhaust gas is supplied to the reformer 152. Further, the exhaust gas is supplied from the opening 170 to the channel 168. After heat exchange between the exhaust gas and the air is carried out, the exhaust gas is discharged to the outside from the exhaust gas pipe 164.

As described above, in the fuel cell system 140, the exhaust fuel gas containing the fuel gas and the water vapor is mixed with the raw fuel before consumption by the sucking action of the ejector 150, and supplied to the reformer 152. Thus, it is possible to use the water vapor in the reformed fuel gas for steam reforming by the reformer 152, and reduce the amount of water supplied from the outside of the fuel cell system 140 to the reformer 152 through the water supply pipe 156. Accordingly, the load of a pump or the like for supplying water to the water supply pipe 156 from the outside is reduced, and improvement in the power generation efficiency is achieved.

INDUSTRIAL APPLICABILITY

According to the present invention, the fuel gas supplied to the first fuel gas channel unit flows into the fuel gas flow field through the fuel gas inlet. After the fuel gas is used at the anode, at least some of the exhaust fuel gas flows through the exhaust fuel gas diverging holes into the second fuel gas channel unit. Thus, at least some of the exhaust fuel gas returns from the second fuel gas channel unit to the fuel gas supply passage through the exhaust fuel gas diverging passage, and used as the fuel gas again. With the simple and compact structure, improvement in the fuel gas utilization ratio is achieved, and the desired power generation reaction occurs.

Further, since the exhaust fuel gas contains water generated in the power generation reaction, the water in the exhaust fuel gas can be utilized for reforming reaction. As a result, it is possible to reduce the amount of the water supplied from the outside advantageously. The load of a water supply pump or the like is reduced, and improvement in the power generation efficiency is achieved.

The invention claimed is:

1. A fuel cell formed by stacking an electrolyte electrode assembly and separators alternately, said electrolyte electrode assembly including an anode, a cathode, and an electrolyte interposed between said anode and said cathode, said fuel cell comprising an oxygen-containing gas flow field for supplying an oxygen-containing gas to said cathode being formed on one surface of each separator, a fuel gas flow field for supplying a fuel gas to said anode being formed on the other surface of each separator, and a fuel gas supply passage for supplying the fuel gas before consumption and extending through said fuel cell in the stacking direction, wherein said separator has a fuel gas channel connected to said fuel gas supply passage, between said fuel gas flow field and said oxygen-containing gas flow field;

said fuel gas channel is divided into first and second fuel gas channel units by a partition;

said first fuel gas channel unit has a fuel gas inlet for supplying the fuel gas before consumption from said fuel gas supply passage to said fuel gas flow field;

said second fuel gas channel unit has an exhaust fuel gas diverging hole for diverging at least some of an exhaust fuel gas which has been used in the reaction at said anode from said fuel gas flow field;

said second fuel gas channel unit is connected to said fuel gas supply passage through an exhaust fuel gas diverging passage said separator includes first and second plates which are stacked together;

said first and second plates have first and second protrusions protruding in different directions;

said first protrusion comprises a plurality of protrusions which contact an inner region of said anode to form said fuel gas flow field and a substantially ring shaped protrusion provided around the plurality of protrusions to contact an outer region of said anode;

said first fuel gas channel unit is formed by the back surfaces of said plurality of protrusions and said partition; and said second fuel gas channel unit is formed by the back surface of said substantially ring shaped protrusion and said partition.

2. A fuel cell according to claim 1, wherein said first and second protrusions function as a current collector for collecting electrical energy generated in said electrolyte electrode assembly.

3. A fuel cell according to claim 1, wherein said exhaust fuel gas diverging hole extends through said substantially ring shaped protrusion in the stacking direction.

4. A fuel cell according to claim 1, wherein said separator has an exhaust gas channel for discharging a fuel gas and an oxygen-containing gas consumed in reaction in the electrolyte electrode assembly as an exhaust gas in the stacking direction; and said fuel gas supply passage and said exhaust fuel gas diverging passage are provided inside said exhaust gas channel.

5. A fuel cell according to claim 1, wherein said first fuel gas channel unit forms a first fuel gas pressure chamber over an electrode surface of said anode such that said first plate is interposed between said first fuel gas pressure chamber and said anode and said first plate contacts said anode under pressure when the fuel gas is supplied into said first fuel gas pressure chamber; and said second fuel gas channel unit forms a second fuel gas pressure chamber over the electrode surface of said anode around said first fuel gas pressure chamber such that said first plate is interposed between said second fuel gas pressure chamber and said anode and said first plate contacts said anode under pressure when the fuel gas is supplied into said second fuel gas pressure chamber.

6. A fuel cell according to claim 1, said fuel cell further comprising an oxygen-containing gas channel connected to said oxygen-containing gas flow field, wherein a third plate for dividing said fuel gas channel and said oxygen-containing gas channel is provided between said first and second plates.

7. A fuel cell according to claim 6, wherein a fuel gas distribution channel connecting said fuel gas supply passage and said fuel gas channel is formed between said first and third plates; and an oxygen-containing gas distribution channel connecting an oxygen-containing gas supply passage for supplying the oxygen-containing gas before consumption in the stacking direction and said oxygen-containing gas channel is formed between said second and third plates.

8. A fuel cell according to claim 1, wherein an evaporator for evaporating water and a reformer, which reforms fuel to produce a fuel gas, connected to said fuel gas supply passage are connected to a stack body of said electrolyte electrode assembly and said separators from the upstream side to the downstream side in a direction of supplying the fuel gas; and said exhaust fuel gas diverging passage is connected between said evaporator and said reformer for supplying the exhaust fuel gas to said reformer.

* * * * *